United States Patent

[11] 3,554,519

| [72] | Inventor | Walter L. Kerlie<br>Forest Hills Borough, Allegheny County, Pa. |
|---|---|---|
| [21] | Appl. No. | 758,317 |
| [22] | Filed | Sept. 9, 1968 |
| [45] | Patented | Jan. 12, 1971 |
| [73] | Assignee | United States Steel Corporation<br>a corporation of Delaware |

[54] FURNACE FOR PRODUCING STEEL CONTINUOUSLY
7 Claims, 5 Drawing Figs.

[52] U.S. Cl............................................. 266/34,
75/52, 75/60; 266/37
[51] Int. Cl............................................. C21c 7/00
[50] Field of Search........................................ 266/34,
34.2, 35, 34T, 36P, 37, 24, 33, 11; 75/45, 52, 60

[56] References Cited
UNITED STATES PATENTS

| 2,622,977 | 12/1952 | Kalling et al................. | 75/55 |
| 2,862,810 | 12/1958 | Alexandrovsky............. | 266/35 |
| 3,275,432 | 9/1966 | Alexandrovsky............. | 75/52 |
| 3,459,415 | 8/1969 | Holeczy et al. .............. | 266/37 |
| 3,463,472 | 8/1969 | Worner........................ | 266/34 |

*Primary Examiner*—Gerald A. Dost
*Attorney*—Walter P. Wood

ABSTRACT: An elongated steel-refining vessel, roofed over the greater portion of its length, has a cross wall spaced inwardly from one end extending upwardly to the roof. This leaves an open intake chamber for receiving molten pig iron. A passage through the wall adjacent the vessel bottom conducts metal to the refining chamber enclosed under the roof. Oxygen lances extend through the roof at an angle to the vertical such that the gas jets tend to push slag floating on the bath toward the wall and through a slag passage therein. Limestone entrained with oxygen delivered by the lances forms the slag to refine the charge. An outlet for refined steel is provided in the vessel bottom and an outlet for effluent gases in the roof. The vessel is preferably mounted for tilting.

INVENTOR
WALTER L. KERLIE

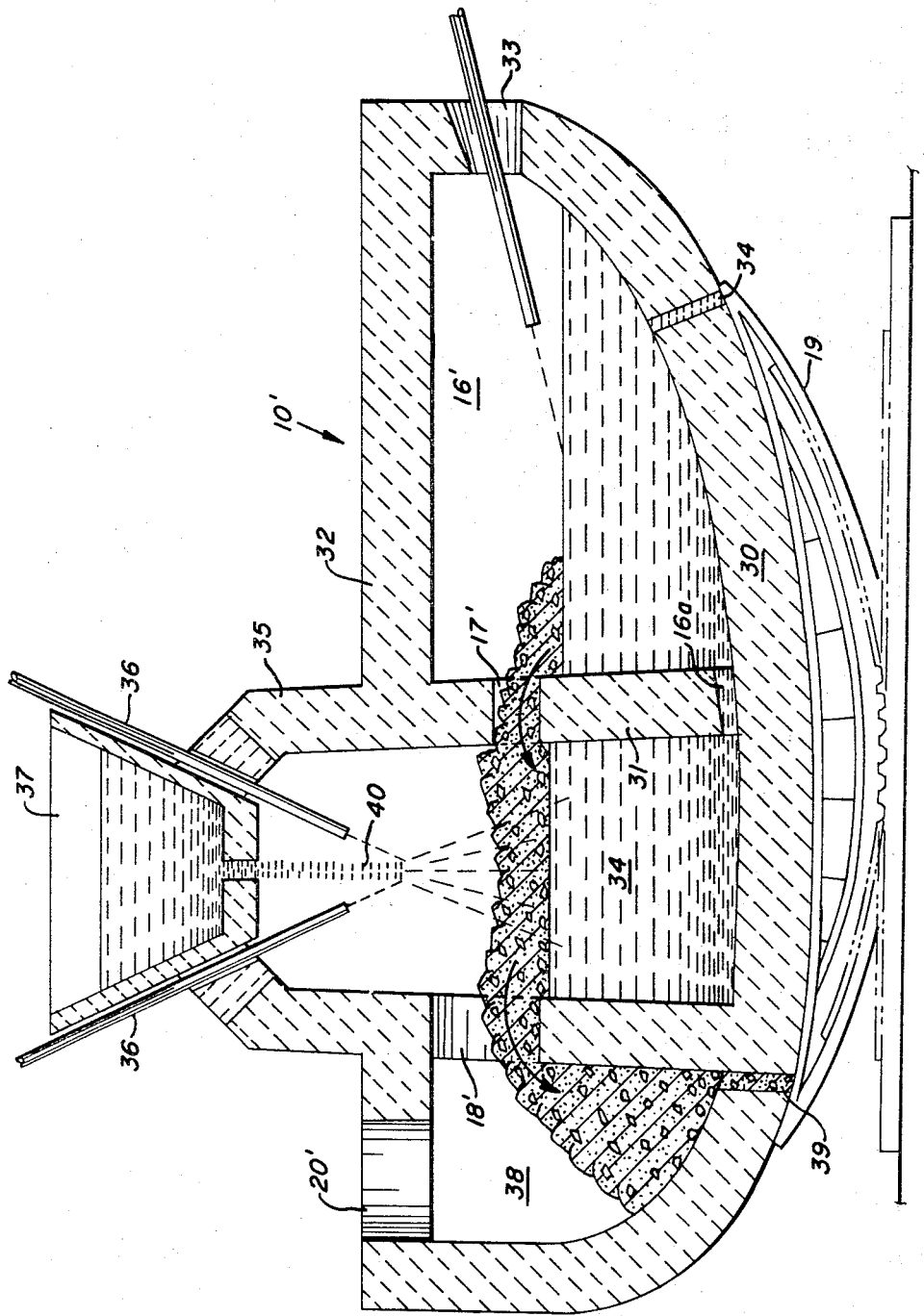

FURNACE FOR PRODUCING STEEL CONTINUOUSLY

This invention relates to a method and apparatus for continuously converting pig iron to steel by the oxygen process.

BACKGROUND OF THE INVENTION

While the continuous production of steel is an objective which has long been sought in the industry, the methods currently in use are essentially batch processes. I have invented a novel process for converting pig iron to steel and a furnace for carrying out the process, both of which are well adapted for continuous operation.

BRIEF SUMMARY OF THE INVENTION

More particularly, my process involves holding a bath of molten metal (pig iron principally, although scrap additions are not excluded) under an oxygen jet which entrains limestone in particulate form to provide a flux layer, the oxygen jet being directed to push slag toward the entrance end of the furnace, while permitting the metal, after being subjected to the refining action of the slag, to be tapped from the exit end.

My improved furnace is a vessel of generally hemiovoidal shape having a cross wall adjacent one end, roofed over from said wall to the other end leaving an open intake chamber between the wall and the first-mentioned end. A passage through the wall near the bottom of the vessel conducts metal from the intake chamber to the roofed portion or refining chamber. A second passage through the wall at a level above the vessel bottom conducts slag formed in the refining chamber back to the intake chamber. Oxygen lances extend through the roof and a fluxing material such as limestone is entrained with the oxygen jets discharged by the lances which are angled to the vertical so that the slag layer resulting is backed up against the wall for return to the intake chamber through the second passage. Finished steel is tapped from the bottom of the refining chamber and an outlet port for effluent gases is formed in the roof.

Further, according to my process, the limestone entrained with the oxygen is calcined to CaO and $CO_2$, the lime forming a basic slag and the $CO_2$ serving to remove carbon from the bath 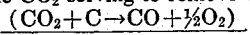 leaving the effluent gas mostly $CO$.

A complete understanding of the invention may be obtained from the following detailed description and explanation which refer to the accompanying drawings illustrating the present preferred embodiment.

BRIEF DESCRIPTION OF THE DRAWINGS

In the drawings:

FIG. 3 is a longitudinal section taken along the plane of line III–III of FIG. 1;

FIG. 5 is a view similar to FIG. 3 showing a further modification.

DETAILED DESCRIPTION OF THE PREFERRED PRACTICE AND EMBODIMENT

Figure 1:
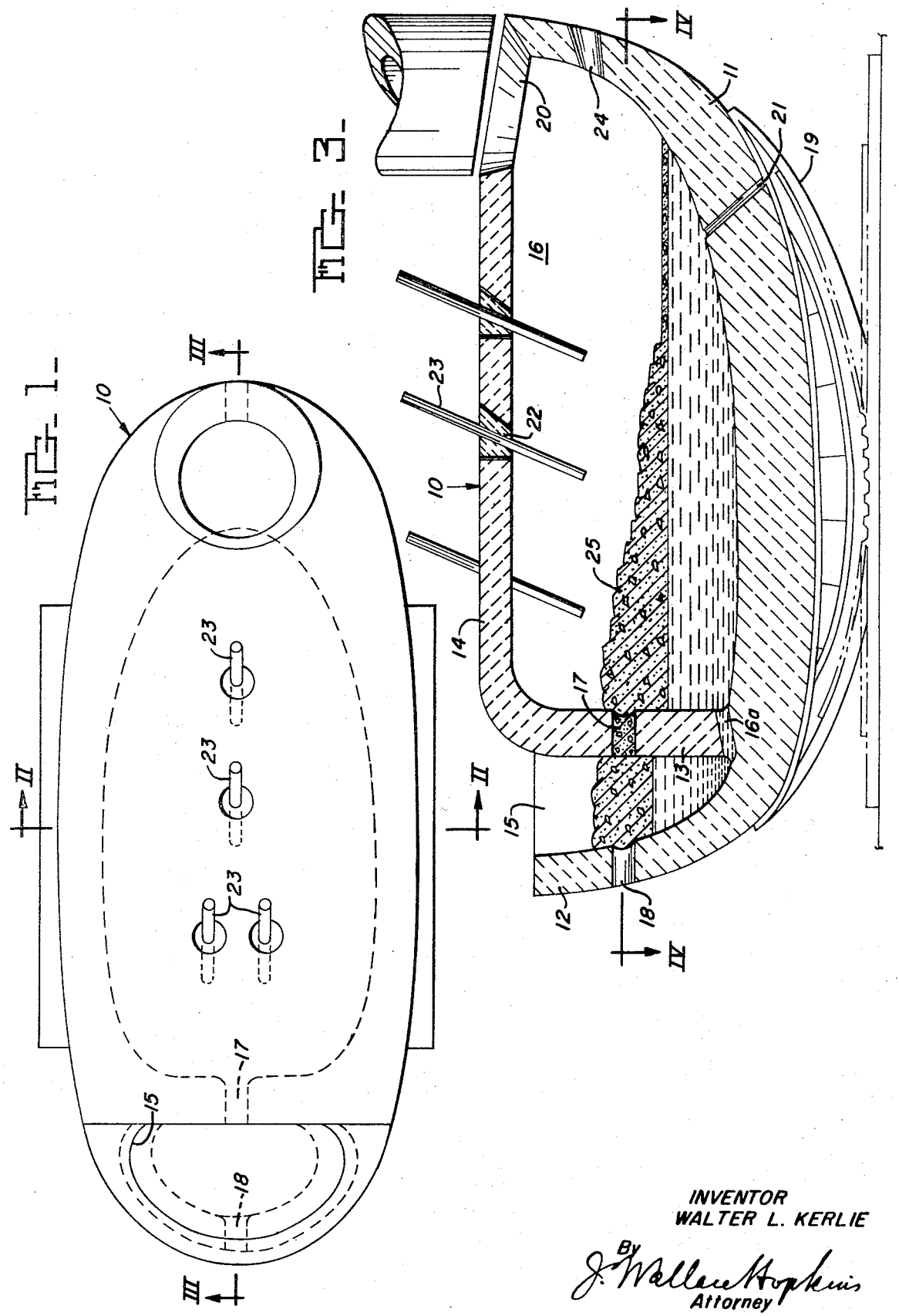
FIG. 1 is a plan view of my furnace.
Figure 2:
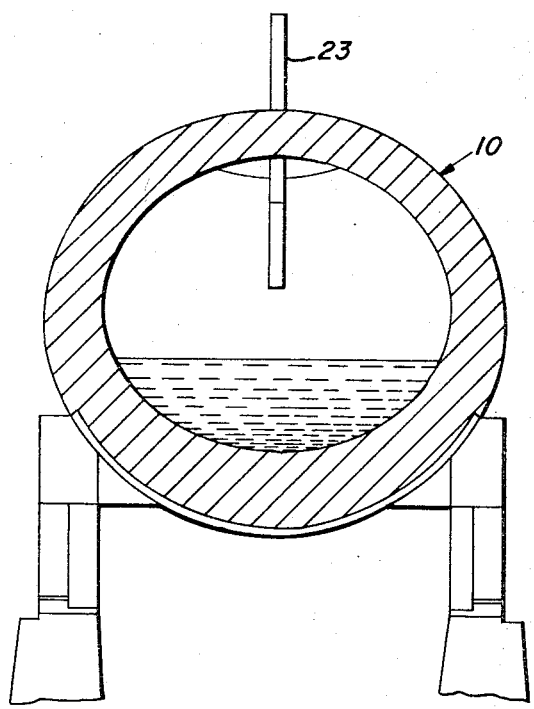
FIG. 2 is a cross-sectional view thereof taken on the plane of line II–II of FIG. 1.

Referring now in detail to the drawings and, for the present to FIGS. 1—3 particularly, my furnace, indicated generally at 10, comprises a hemiovoidal bottom 11 having a sidewall or rim 12 rising upwardly therefrom. A cross wall 13 near one end of the furnace merges into a roof 14 over the greater portion of the furnace length to form an open intake or receiving chamber 15 and an enclosed refining chamber 16. Wall 13 has a metal flow-through port 16a and a slag flow-through port 17. Chamber 15 has a slag outlet 18 generally aligned with port 17. The furnace is mounted on rockers 19 for tilting in a longitudinal direction. An outlet 20 in roof 14 for effluent gases is located near the end of the furnace opposite chamber 15. A tap hole 21 is formed in bottom 11.

Roof 14 has holes formed therein adapted to receive removable tapered blocks 22. Oxygen lances 23 extend through blocks 22 so that, when installed, they are inclined from the vertical toward wall 13. A sight hole 24 is provided in rim 12 above tap hole 21.

The method of my invention is as follows: Hot metal (molten pig iron) is introduced into chamber 15 from a ladle not shown and maintained at a level below the bottom of ports 17 and 18. The hot metal flows through port 16a into chamber 16, and is there oxidized by oxygen having limestone entrained therewith, introduced by lances 23 from a source not shown. The steel resulting from the refining of pig iron exits furnace 10 through tap hole 21. The lances 23 being set at an angle to the metal bath, assist the flow of slag toward the hot-metal oxidizing zone, as indicated at 25, in a direction counter to that of the flowing metal, and displace it through the slag port 17. Thus, the slag is caused to flow over the hot metal in chamber 16 before leaving the furnace through the slag outlet 18. In its passage from port 17 to outlet 18, the flowing slag filters any kish and slag from the hot metal pouring into chamber 14, and also permits any steel carried in suspension in the refining slag to sink down and reenter the furnace with the hot metal.

FIG. 1 shows the preferred arrangement of four lances 23 wherein the two nearest wall 13 are used for the injection of oxygen into the refining chamber 16 and the remaining lances are used to inject limestone (with or without spar or other fluxing agents) with the oxygen to complete the refining reaction. The limey slag formed by the injected limestone flows toward wall 13 and fluxes the impurities $SiO_2$, $P_2O_5$, etc., created by the oxygen from the other lances.

Steel refined by the slag may be tapped continuously from tap hole 21.

By virtue of rockers 19, the furnace can be tilted to facilitate startup operations, in which an initial pool of hot metal in the vessel may be first converted completely to steel before the vessel is returned to the normal position for continuous operation. When necessary, the vessel may be tilted in the opposite direction to drain the furnace for fettling or for a close-down operation.

Figure 4:
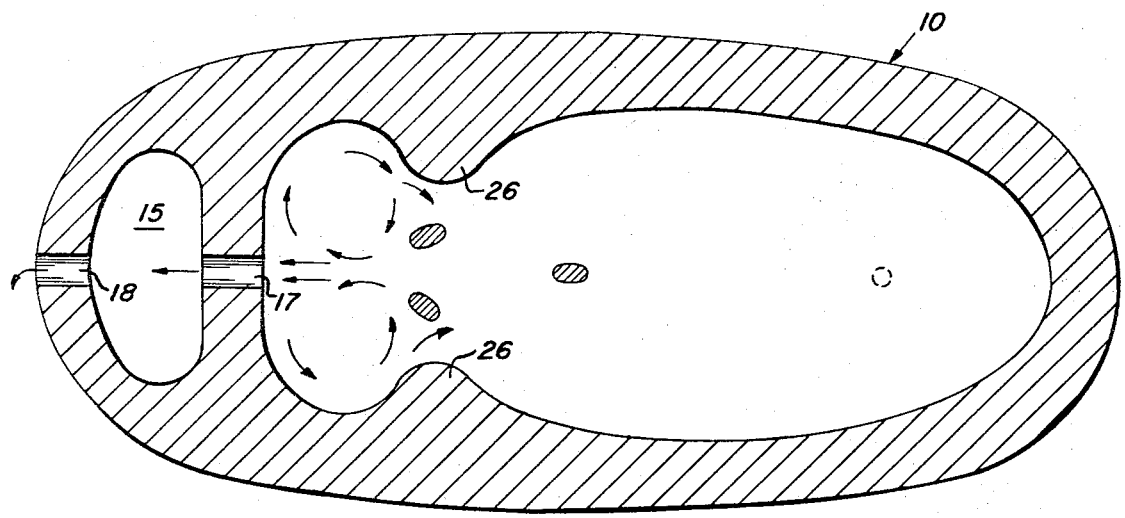
FIG. 4 is a horizontal section taken along the plane of line IV–IV of FIG. 3, showing a slight modification.

Important features in the design of the furnace are the location of the lances for supplying oxygen or oxygen and limestone to effect the movement of the slag layer relative to the flow of the liquid metal. FIG. 4 illustrates one modification in furnace design to achieve a general pattern (indicated by arrows) of surface flow of slag and metal in the hot-metal reaction zone. This is effected by building up on the furnace bottom, raised portions 26 forming a necked-in passage of reduced width. In the method of my invention, slag must be removed from the furnace at a rate corresponding to the rate of input of limestone and hot metal, otherwise the furnace chamber would either become filled with slag or the dwell of the slag in the furnace would be too short to obtain the required degree of refining. Consequently, the location and size of the slag port 17 and outlet 18 should be related to the size of the vessel, the rate of input of hot metal and limestone, and the number and location of the oxygen lances.

Periodically, it will become necessary to change one or more oxygen lances for inspection, but particularly for the removal of encrustations of slag and metal. The removable blocks 22 facilitate this change and allow adjustment of the portion of the lance within the furnace to the position desired for effective refining.

Because (1) the quantity of fluorspar to be used increases with the carbon content of the steel, (2) the slag volume increases with the silicon in the hot metal, and (3) effective desulfurization and dephosphorization will occur with countercurrent flow of slag and metal, high-basicity slags (greater than 3.5) are not considered necessary and low-basicity slags (between 2.0 and 2.6) should prove quite satisfactory. It should be noted that, for the entire range of conditions, the weight of limestone is within the range $190 \pm 60$ lb./ton of hot metal. Consequently, my process makes it possible to continuously refine hot metal to steels having carbon contents up to 1.0 percent, which process can be operated satisfactorily with limestone only as the cooling agent, the use of scrap, ore or other cooling agents being unnecessary.

Compared with conventional basic-oxygen steelmaking (top blowing with oxygen) in which the oxygen consumption is approximately 2,000 scf/ton of hot metal, my continuous limestone-oxygen steelmaking process requires only approximately 1,500 scf/ton of hot metal, because the $CO_2$ from the dissociation of the limestone acts as an oxidizing agent and constitutes part of the oxygen requirement.

The quantity of gas continuously leaving the system varies with the composition of the hot metal but is usually between 3,000 and 4,000 scf/ton of hot metal for the broad range of conditions represented in FIG. 4. The corresponding amount of CO in the off-gas (usually 80 to 92 percent) will have an average thermal value (sensible heat plus heat of reaction) of about 350 B.t.u./scf, sufficient heat for separate open-hearth furnaces to melt the uprising scrap (casting and rolling) following the production of liquid steel in a continuous limestone-oxygen steelmaking facility.

The flow rates of oxygen and limestone are determined according to the desired carbon content and temperature of the steel and the flow rate and composition of the hot metal. The composition of the waste gas (CO and $CO_2$) is useful guide to the carbon content of the steel, the temperature of which can be measured continuously as it leaves the furnace, and samples of which can be taken when required for rapid chemical analyses.

DETAILED DESCRIPTION OF MODIFIED EMBODIMENT AND PRACTICE

Referring now to FIG. 5, the modified furnace 10' there shown is generally similar to furnace 10 in that it has a hemiovoidal bottom 30, a cross wall 31, a roof 32 and an oxygen lance 33 removably installed near one end, angled toward the other end. Other similar features are designated by corresponding numerals primed.

The furnace of FIG. 5 differs from that previously described in that the intake or receiving chamber 34 is surmounted by a turret 35, provided with oxygen-limestone lances 36, and adapted to receive and support a tundish 37. A slag-accumulation chamber 38 on the opposite side of chamber 34 from the refining chamber 16', has an outlet 20' for effluent gases and a slag outlet 39.

A hot-metal stream 40 descending from tundish 37 is converted into a spray by the impingement of jets from lances 36 and the refining action is initiated in chamber 34. Powdered limestone and oxygen are introduced into the chamber 34 through the lances 36 from a source not shown, so that said limestone and oxygen strike the falling stream of hot metal, thereby breaking it up into droplets and oxidizing them. The partially refined metal flows through the runner port 16a into the chamber 16', wherein said metal is further refined by limestone and oxygen provided through the lance 33 from a source not shown. The refined metal exits chamber 16' through the tap hole 34. The slag products in chamber 16' are propelled by the limestone-oxygen flow from lance 33 in a direction counter to that of the refined metal so that said slag passes through port 17' into chamber 34 and thence through the outlet 18' into chamber 38, from which it exits through outlet 39.

It will be evident that my invention has numerous advantages in addition to its capability of continuous operation. In my improved furnace, air is prevented from entering the system by the constant flow of waste gas through the outlet 20 and by the constant flow of slag from the slag outlet 18. Consequently, it is possible to produce steels with low contents of nitrogen. The effluent gases, unlike the gas issuing from the mouth of a conventional top-blown oxygen vessel, has a relatively constant CO content of about 90 percent, and is therefore eminently suitable for chemical manufacture, for use as a fuel to melt scrap in an open-hearth-type furnace, or for steam raising. Consequently, it is good economy to retain existing open-hearth furnaces to operate in conjunction with my continuous limestone-oxygen steelmaking facility.

Although I have disclosed herein the preferred embodiment and practice of my invention, I intend to cover as well any change or modification therein which may be made without departing from the spirit and scope of the invention as set forth in the claims.

I claim:

1. In a steelmaking furnace, a vessel having a generally hemiovoidal bottom and a roof over the greater portion of its length, a cross wall spaced from one end extending upwardly to said roof, leaving an intake chamber beyond the cross wall at said end, said wall having a flow-through passage adjacent the bottom for metal and a similar passage spaced above the bottom for slag, an opening for effluent gases in said roof and a gas-discharge lance extending into the furnace, angled from the vertical toward said cross wall.

2. Apparatus as defined in claim 1, characterized by a slag outlet in said one end of the vessel generally in alignment with said second-mentioned passage.

3. Apparatus as defined in claim 1, characterized by said vessel having a metal outlet in its bottom adjacent said other end.

4. Apparatus as defined in claim 1, characterized by said furnace having a block removably placed therein, said lance being fitted in said blocks.

5. Apparatus as defined in claim 1, characterized by means mounting said vessel for longitudinal tilting movement.

6. Apparatus as defined in claim 1, characterized by a turret rising above said intake chamber adapted to support a tundish draining into said intake chamber, and oxygen lances extending through said turret adapted to discharge jets impinging on the stream descending from the tundish.

7. Apparatus as defined in claim 1, characterized by a slag-accumulation chamber on the opposite side of said intake chamber from said roofed-over portion of the furnace length.